United States Patent
Roche

(10) Patent No.: US 10,094,617 B2
(45) Date of Patent: Oct. 9, 2018

(54) CONTACT PLATE FOR AN ELECTRODE OF AN ELECTRO-METALLURGICAL FURNACE AND METHOD FOR PRODUCING SUCH A PLATE

(71) Applicant: FAI PRODUCTION, Domene (FR)

(72) Inventor: Christian Roche, Paris (FR)

(73) Assignee: FAI PRODUCTION, Domène (FR)

( * ) Notice: Subject to any disclaimer, the term of this patent is extended or adjusted under 35 U.S.C. 154(b) by 420 days.

(21) Appl. No.: 14/764,532

(22) PCT Filed: Jan. 28, 2014

(86) PCT No.: PCT/EP2014/051578
§ 371 (c)(1),
(2) Date: Jul. 29, 2015

(87) PCT Pub. No.: WO2014/118147
PCT Pub. Date: Aug. 7, 2014

(65) Prior Publication Data
US 2015/0369540 A1     Dec. 24, 2015

(30) Foreign Application Priority Data
Jan. 29, 2013 (FR) ..................................... 13 50717

(51) Int. Cl.
*H05B 7/10*     (2006.01)
*F27B 3/08*     (2006.01)
(Continued)

(52) U.S. Cl.
CPC ................ *F27B 3/08* (2013.01); *B23P 15/26* (2013.01); *F27B 3/085* (2013.01); *F27B 3/24* (2013.01);
(Continued)

(58) Field of Classification Search
CPC ...... F27B 3/08; F27B 3/10; F27B 3/24; F27B 3/085; F27B 3/62; H05B 3/62;
(Continued)

(56) References Cited

U.S. PATENT DOCUMENTS

2013/0208756 A1*   8/2013   Cho .......................... F23M 5/08
                                                                        373/158

FOREIGN PATENT DOCUMENTS

FR         2109430 A5     5/1972
FR      2 835 687 A1     8/2003
(Continued)

OTHER PUBLICATIONS

International Search Report dated Apr. 28, 2014, issued in corresponding International Application No. PCT/EP2014/051578, filed Jan. 28, 2014, 3 pages.

*Primary Examiner* — Hung D Nguyen
(74) *Attorney, Agent, or Firm* — Christensen O'Connor Johnson Kindness PLLC

(57) ABSTRACT

Contact plate for placing in contact with the wall of an electrode of an electro-metallurgical furnace. The contact plate includes an internal channel having an inlet and at least one outlet. The inlet and outlet are respectively linked to an external intake duct and to at least one external duct for discharging a fluid. An elongate hole (16) has an elongate partition (35) which has opposing elongate edges (39) adjacent to opposing elongate zones (33) of the elongate hole so as to define, in the hole, elongate spaces (16a-16b) on either side of the elongate partition. The elongate partition defines a connecting passage (41) between the elongate spaces and link holes (29) communicating with the elongate spaces being formed at a distance from the connecting passage. The elongate spaces form portions of the internal channel (59).

6 Claims, 6 Drawing Sheets

(51) Int. Cl.
  *F27D 11/10* (2006.01)
  *H05B 7/105* (2006.01)
  *B23P 15/26* (2006.01)
  *F27B 3/24* (2006.01)
  *H05B 3/62* (2006.01)
  *F27D 99/00* (2010.01)

(52) U.S. Cl.
  CPC ............... *F27D 11/10* (2013.01); *H05B 3/62* (2013.01); *H05B 7/10* (2013.01); *H05B 7/105* (2013.01); *F27D 2099/0021* (2013.01); *Y10T 29/49378* (2015.01)

(58) Field of Classification Search
  CPC . H05B 7/10; H05B 7/105; B23P 15/26; F27D 2099/0021; F27D 11/10; Y10T 29/49378
  USPC ... 373/59, 69, 88, 89, 90–97, 100, 101, 158, 373/113, 114, 154
  See application file for complete search history.

(56) References Cited

FOREIGN PATENT DOCUMENTS

| | | |
|---|---|---|
| FR | 2 891 981 A1 | 4/2007 |
| FR | 2 922 076 A1 | 4/2009 |
| WO | 03/069956 A1 | 8/2003 |
| WO | 2004/036958 A1 | 4/2004 |
| WO | 2010/103225 A1 | 9/2010 |

\* cited by examiner

CONTACT PLATE FOR AN ELECTRODE OF AN ELECTRO-METALLURGICAL FURNACE AND METHOD FOR PRODUCING SUCH A PLATE

The present invention relates to the field notably of electro-metallurgical furnaces in which vertical electrodes, generally cylindrical, are surrounded by an electrical connection device which generally comprises a ring of contact plates in contact with the wall of the electrode, and holding means generally comprising a holding ring with segments surrounding the ring of plates and radial plunger cylinders interposed between the plates and the holding segments.

Currently, the plates have a continuous internal channel of which the openings formed on the top face of the plates are linked to external ducts from an installation for circulating a coolant such as water, so as to cause this fluid to circulate in said channel and cool the plates.

This channel is produced notably by drilling the plates and generally comprises a horizontal link branch, formed in the bottom part of the plates and obtained by horizontally drilling a blind or through hole from a radial side of the plates, then closing its end or ends by one or more embedded or welded or screwed and bonded plugs.

It has been found that the existence of the above plug or plugs, placed in the bottom, hottest, part of the plate, constitutes a weakness and represents a hazard in case of detection of a plug because, in this case, the coolant pours into the bath and can cause an explosion of the bath by the abrupt evaporation of the coolant such as water. Furthermore, with the heat being intercepted primarily in the peripheral areas of the plate, the central part thereof has a tendency to be hotter, which negatively influences the passage of the current and the baking of the electrode paste.

The patent FR 2 891 981 moreover describes a contact plate in which vertical holes are fitted with axial ducts delimiting, in these holes, peripheral spaces and central spaces linked to the bottom of the holes and linked to horizontal manifold holes so as to ensure parallel circulations of the coolant in the holes. It is however, fairly difficult to obtain uniform parallel circulations of the coolant in the different holes.

The aim of the present invention is to improve the cooling means of said contact plates.

A contact plate is proposed that is intended to be placed in contact with the wall of an electrode of an electro-metallurgical furnace.

This contact plate comprises at least one internal channel having at least one inlet and at least one outlet likely to be respectively linked to at least one external fluid intake duct and to at least one external duct for discharging this fluid.

At least one elongate hole is formed, inside which is installed an elongate partition which has opposed elongate edges adjacent to opposing elongate zones of the elongate hole so as to define, in said hole, elongate spaces on either side of the elongate partition, the elongate partition being formed in such a way as to define a connecting passage between said elongate spaces and link holes communicating with said elongate spaces being formed at a distance from said connecting passage, said elongate spaces forming portions of said internal channel.

The contact plate can comprise a plurality of elongate holes provided with elongate partitions, of which the elongate spaces are successively linked in series by link holes formed in the plate.

Said connecting passage can be formed in the vicinity of an end of said elongate hole.

Said connecting passage can be formed between an end of the elongate partition and an end of said elongate hole.

An end of said elongate partition opposite to its end defining said connecting passage can be borne by a blocking element fitted into said elongate hole.

Said elongate hole can extend from top to bottom and has a blind bottom end, the bottom end of said elongate partition defining a connecting passage formed in the vicinity of this blind end, the top end of the elongate partition being carried by a blocking element fitted into a top part of said elongate hole situated above said link holes.

Said hole and said partition can have opposing elongate ribs and opposing elongate grooves, which are fitted into one another.

Said elongate hole can comprise two eccentric cylindrical elongate drillings partially overlapping and of which the intersecting elongate parts determine protruding opposing elongate ribs.

Also proposed is a method for manufacturing a vertical plate having inner and outer faces, top and bottom faces and circumferential end side faces.

This method comprises:
drilling blind elongate holes from the top face, which extend downward without reaching the bottom face,
drilling at least one horizontal link hole from at least one of the side faces, parallel to the inner face and to the top face and connecting said vertical holes,
fitting, into at least some of said elongate holes, elongate partitions in a position such that the partitions have opposing elongate edges adjacent to opposing elongate zones of the elongate holes and determine a connecting passage in the vicinity of the blind bottom ends of the holes, the elongate partitions being secured to blocking elements of the elongate holes situated above said horizontal hole.

The method can comprise: performing the above-mentioned steps in a flat plate and, in a subsequent step, bending this plate such that its inner face forms a cylinder segment.

The present invention will be better understood on studying contact plates for electrodes notably for electro-metallurgical furnaces, described by way of nonlimiting examples and illustrated by the drawing in which.

Figure 1:
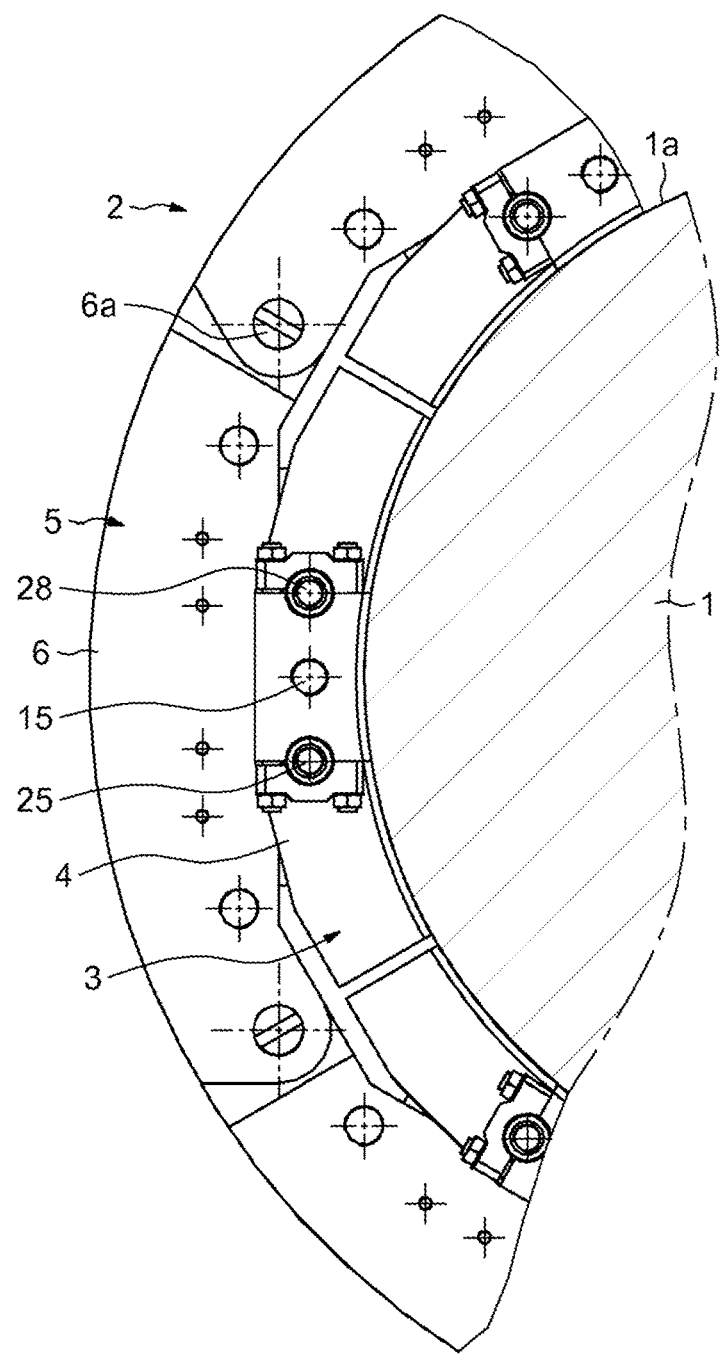
FIG. 1 represents a partial plan view of an electro-metallurgical furnace equipment item.
Figure 2:
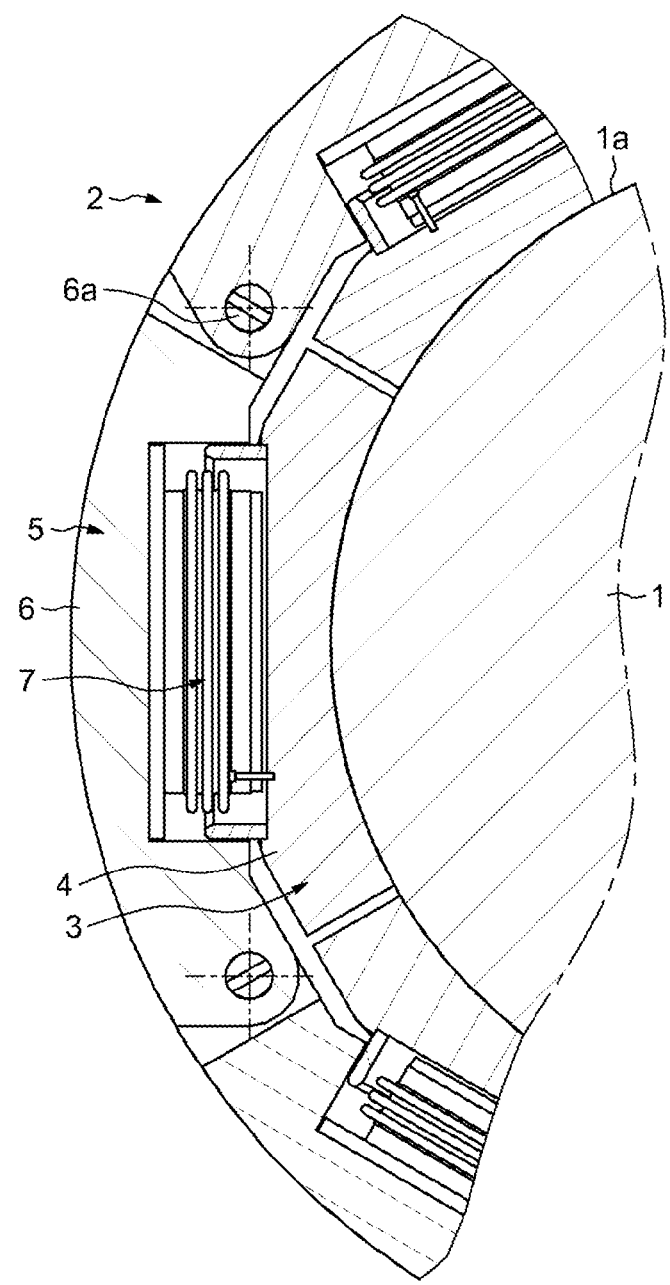
FIG. 2 represents a horizontal cross section, substantially at mid-height of the equipment item of FIG. 1.
Figure 3:
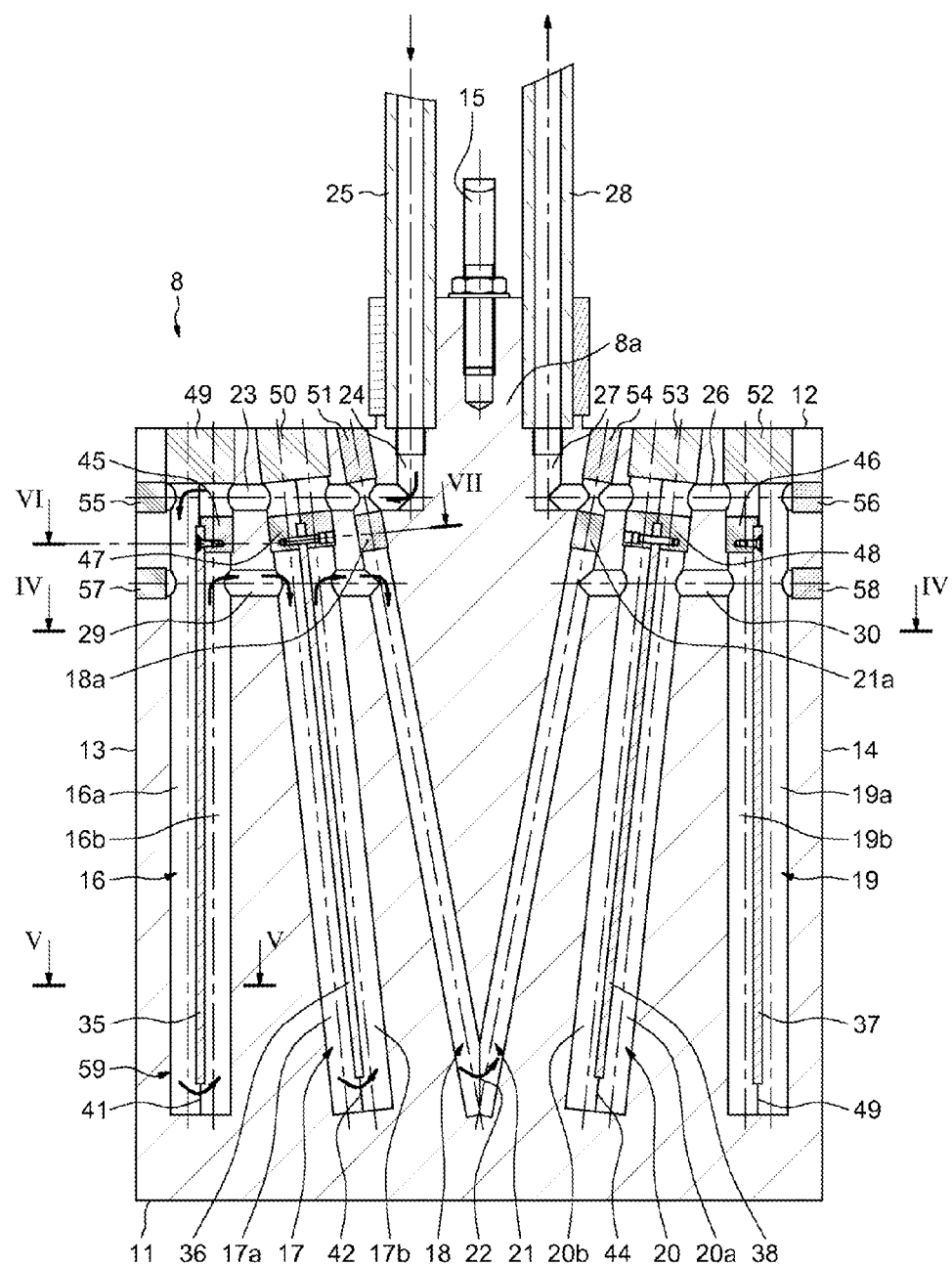
FIG. 3 represents a vertical cross section along a cylindrical surface of a plate according to the invention, according to III-III of FIG. 4.
Figure 4:
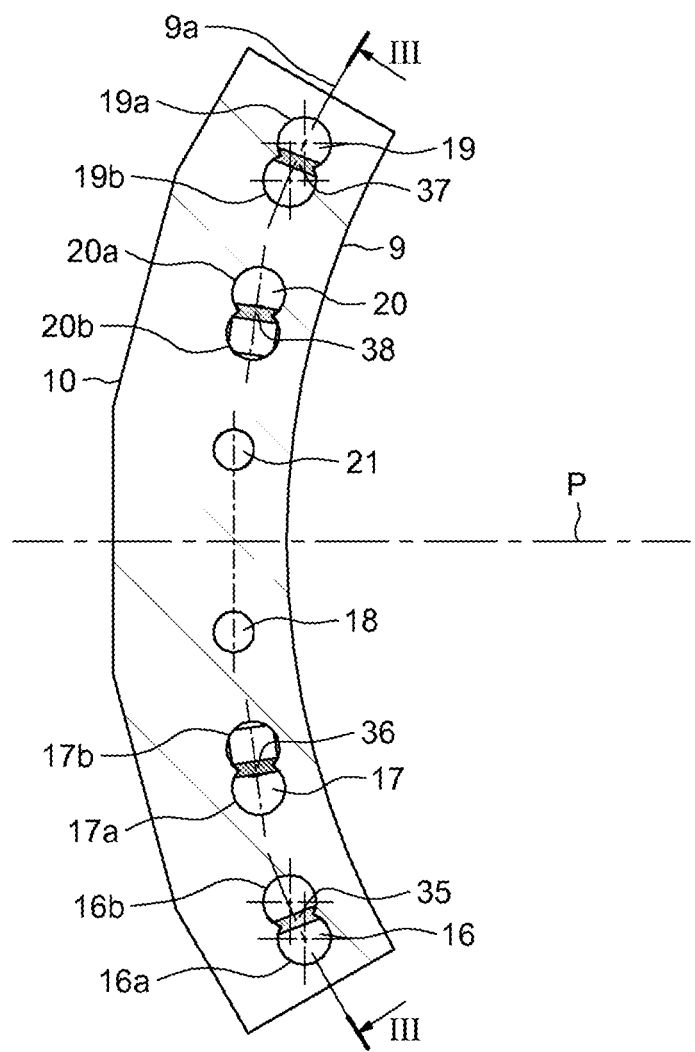
FIG. 4 represents a horizontal cross section according to IV-IV of the plate of FIG. 3.

By referring to FIGS. 1 and 2, it can be seen that there is partially represented an equipment item of an electro-metallurgical furnace which comprises a vertical cylindrical electrode 1, including a paste to be baked, surrounded by an electrical connection device 2.

This electrical connection device 2 comprises a suspended ring 3 consisting of a plurality of circumferentially adjacent contact plates 4 in contact with the peripheral wall 1a of the electrode 1, surrounded, for example, by a suspended holding ring 5 consisting of a plurality of circumferentially adjacent segments 6 linked together by vertical axes 6a and plunger cylinders 7 interposed between the contact plates 4 and the segments 6.

By referring to FIGS. 3 to 7, there now follows a description of an exemplary embodiment of a plate 8 likely to constitute, respectively, the contact plates 4 of the electrical connection device 2.

The contact plate 8 has a cylindrical inner face 9 intended to be in contact with the electrode 1, a substantially cylindrical outer face 10 concentric to the face 9, a radial bottom face 11, a radial top face 12 and two circumferential end vertical faces 13 and 14 situated in planes approximately containing the axis of the electrode 1.

The contact plate 8 comprises a central part 8a protruding upward relative to its top face 12 and to which is attached the bottom end of a suspension bar 15.

Formed from its top face 12 extending downward to proximity to its bottom face 11 without reaching the latter and arranged along a cylindrical surface 9a concentric to the inner face 9, the plate 8 has:

blind elongate holes 16, 17 and 18 emerging through the part of the top face 12 situated on one side of the protruding part 8a and arranged in succession from the end face 13, and blind elongate holes 19, 20 and 21 emerging through the part of the top face 12 situated on the other side of the protruding part 8a and arranged in succession from the end face 14.

The blind holes 16 and 19 extend vertically, the blind holes 17 and 20 are slightly inclined and move away from the holes 16 and 17 from top to bottom and the blind holes 18 and 21 are even more inclined and are joined in their bottom parts via a passage 22, such that the end parts of all these holes are distributed in the circumferential direction of the plate 8.

The elongate holes 16, 17 and 18 on the one hand and the elongate holes 19, 20 and 21 thus form groups of holes arranged symmetrically relative to a median plane P of the plate 8 passing through the axis of the electrode 1.

The contact plate 8 further has:

a blind horizontal hole 23 which is formed from its end face 13 and in the top part of the plate 8, which passes through the elongate holes 16, 17 and 18, and the inner end of which communicates with the bottom end of a blind vertical hole 24 which is situated in the zone of the protruding part 8a and on the top end of which is connected an external duct 25, and, symmetrically relative to the plane P, a blind horizontal hole 26 which is formed from its end face 14 and in the top part of the plate 8, which passes through the elongate holes 19, 20 and 21 and the inner end of which communicates with the bottom end of a blind vertical hole 27 which is situated in the zone of the protruding part 8a and on the top end of which is connected an external duct 28.

The contact plate 8 also has:

a blind horizontal hole 29 which is formed from its end face 13 and in the top part of the plate 8, below and at a distance from the horizontal hole 23, which passes through the elongate holes 16 and 17 and which emerges in the elongate hole 18, and, symmetrically relative to the plane P, a blind horizontal hole 30 which is formed from its end face 14 and in the top part of the plate 8, below and at a distance from the horizontal hole 26, which passes through the elongate holes 19 and 20 and which emerges in the elongate hole 21.

The horizontal holes 23, 26, 29 and 30 extend in the circumferential direction of the contact plate 8.

Figure 5:
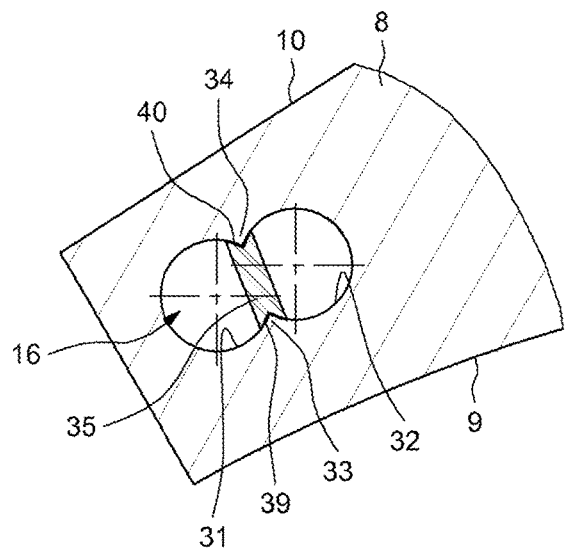
FIG. 5 represents a partial horizontal cross section of the plate of FIG. 3, in the middle zone of an elongate hole.

As illustrated more particularly in FIG. 5, the elongate holes 16, 17, 19 and 20 result respectively from two cylindrical drillings 31 and 32, for example of identical diameters, which are eccentric relative to the circumferential direction of the plate 8 and which partially overlap, the distance between their axes being less than their diameter. The holes 16, 17, 19 and 20 exhibit a section in the form of two opposing joined circular petals. Thus, the elongate parts of intersection of the drillings 31 and 32 determine opposing elongate positioning ribs 33 and 34 respectively protruding into the holes 16, 17, 19 and 20, the elongate ribs 33 being on the inner side and the elongate ribs 34 being on the outer side of the plate 8.

The elongate holes 18 and 21 result from cylindrical drillings.

In the elongate holes 16, 17, 19 and 20, elongate partitions 35, 36, 37 and 38 are arranged which pass through them by dividing them up and which comprise elongate opposing edges respectively having opposing elongate positioning grooves 39 and 40 into which the corresponding opposing ribs 33 and 34 of the holes 16, 17, 19 and 20 are respectively fitted (FIG. 5).

The bottom ends of the elongate partitions 35, 36, 37 and 38 are at short distances from the bottom ends or bottoms of the elongate holes 16, 17, 19 and 20 so as to determine corresponding passages 41, 42, 43 and 44 in the bottom parts of these holes.

Figure 6:
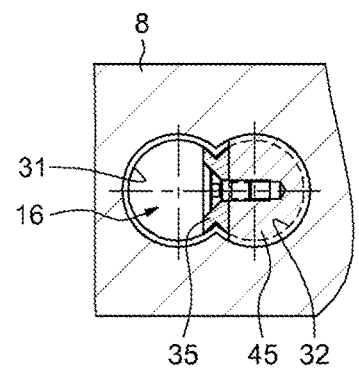
FIG. 6 represents a partial horizontal cross section of said first plate, in the zone of an element forming a partial plug.

The top ends of the elongate partitions 35 and 37 are borne by and fixed onto partial blocking elements 45 and 46 which are arranged in the elongate holes 16 and 19, respectively between the horizontal holes 23 and 29 and between the horizontal holes 26 and 30. The partial blocking elements 45 and 46 block half of the elongate holes 16 and 19 by closely following the form of half of their section, namely, respectively, the drillings situated on a side of the elongate holes 35 and 37 and on the side of the adjacent elongate holes 17 and 20 (FIG. 6).

Figure 7:
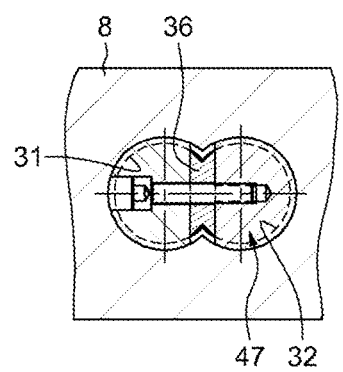
FIG. 7 represents a partial horizontal cross section of said first plate, in the zone of an element forming a total plug.

The top ends of the elongate partitions 36 and 38 are borne by and fixed onto total blocking elements 47 and 48 which are arranged in the elongate holes 17 and 20, respectively between the horizontal holes 23 and 29 and between the horizontal holes 26 and 30. The total blocking elements 45 and 46 totally block the elongate holes 16 and 19 by closely following the form of their section, namely, respectively, the drillings situated on both sides of the elongate partitions 36 and 38 (FIG. 7). The elements 47 and 48 can be in two parts between which are sandwiched the top ends of the elongate partitions 36 and 38.

Thus, the elongate partitions 35, 36, 37 and 38 extend in planes containing substantially the axis of the electrode 1 and face portions of the horizontal holes 29 and 30.

The parts of the elongate holes 18 and 21 situated respectively between the holes 23 and 29 and between the holes 26 and 30 are blocked by total blocking elements 18a and 21a.

The top parts of the elongate holes 16, 17, 18, 19, 20 and 21, situated above the horizontal holes 23 and 26, are blocked by plugs 49, 50, 51, 52, 53 and 54.

The end parts of the horizontal holes 23, 26, 29 and 30, situated respectively between the end faces 13 and 14 of the contact plate 8 and the elongate holes 16 and 19, are blocked by plugs 55, 56, 57 and 58.

The result of the above is that the contact plate 8 comprises an internal channel 59 whose ends are linked to the external ducts 25 and 28, of which portions are defined by the vertical holes 24 and 27, of which portions are defined by the horizontal link holes 23 and 26, of which portions are defined by portions of the horizontal link holes 29 and 30, of which portions are defined, in the holes 16, 17, 19 and 20, by elongate flow spaces 16a-16b, 17a-17b, 19a-19b and 20a-20b which are formed on either side of the elongate partitions 35, 36, 37 and 38 and which communicate through the bottom connecting passages 41, 42, 43 and 44 and of which portions are defined by the elongate holes 18 and 21.

Thus, the bottom connecting passage between the elongate spaces of each elongate hole is situated vertically at a distance from the corresponding horizontal holes of which portions form an inlet into one and an outlet from the other of these elongate spaces.

The intake and discharge ducts 25 and 28 are linked to a fluid source having fluid driving means.

Thus, a coolant such as water, entering for example through the external duct 25, circulates in succession or in series:
in the vertical hole 24,
in the horizontal hole 23 by passing between the blocking elements and the corresponding plugs,
downward in the elongate space 16a of the elongate hole 16,
upward in the elongate space 16b of the elongate hole 16 by having passed through the bottom connecting passage 41,
downward in the elongate space 17a of the elongate hole 17 by having passed through a portion of the horizontal hole 29,
upward in the elongate space 17b of the elongate hole 17 by having passed through the bottom connecting passage 42,
downward in the elongate hole 18 by having passed through a portion of the hole 29,
upward in the elongate hole 21 by having passed through the bottom connecting passage 22,
downward in the elongate space 20b of the elongate hole 20 by having passed through a portion of the horizontal hole 30,
upward in the elongate space 20a of the elongate hole 20 by having passed through the bottom connecting passage 44,
downward in the elongate space 19b of the elongate hole 19 by having passed through a portion of the horizontal hole 30,
upward in the elongate space 19a of the elongate hole 19 by having passed through the bottom connecting passage 43,
into the horizontal hole 26 by passing between the blocking elements and the corresponding plugs,
and finally into the vertical hole 27.

The fluid is then discharged through the external duct 28.

Should the coolant enter through the external duct 28, it would circulate in the other direction and would be discharged by the external duct 25.

To manufacture the contact plate 8, it is possible to proceed as follows.

Take a flat plate, generally copper-based metal.

Produce the above-mentioned holes by piercing or drilling.

Fit the partitions 35, 36, 37 and 38 provided with the support and blocking elements 45, 46, 47 and 48 by sliding them into the corresponding holes 16, 17, 19 and 20, until these elements come into contact on shoulders formed in these holes.

Fit the blocking elements 18a and 21a and the end plugs 49 to 58 into the corresponding holes as far as the shoulders formed therein.

Deform, for example by hot bending, said duly equipped flat plate until the contact plate 8 is obtained in such a way that its bottom face forms a cylinder segment.

Figure 8:
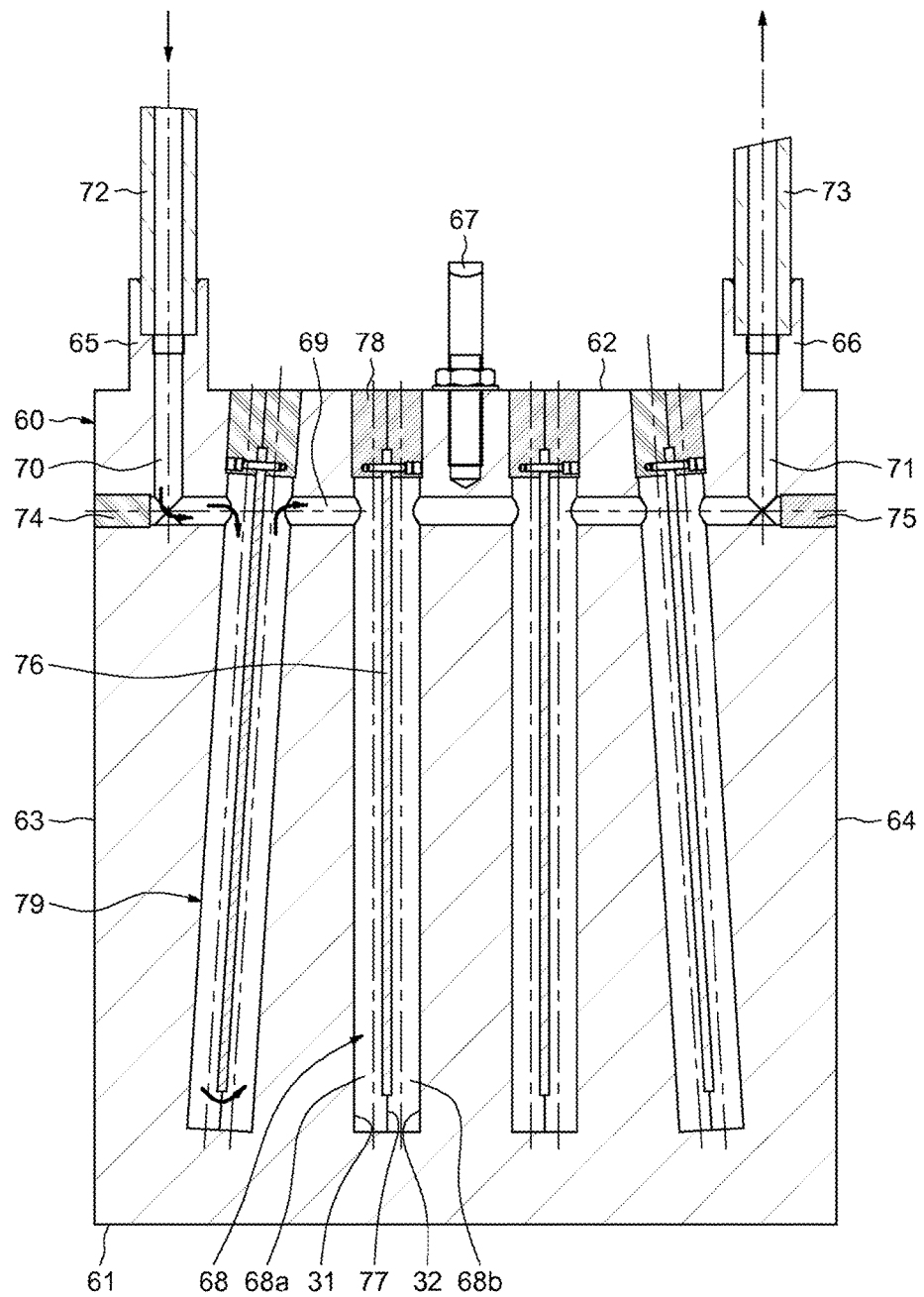
FIG. 8 represents a vertical cross section along a cylindrical surface of another plate according to the invention.

Referring to FIG. 8, there now follows a description of another exemplary embodiment of a plate 60 that can also respectively constitute the contact plates 4 of the electrical connection device 2.

The contact plate 60 has a radial bottom face 61, a radial top face 62 and circumferential vertical end faces 63 and 64 and comprises parts 65 and 66 which protrude upward relative to the top face 62 and which are situated on the side of the vertical end faces 63 and 64.

The bottom end of a suspension bar 67 is attached to the median zone of the top face 32 of the contact plate 60.

The contact plate 60 comprises a plurality of substantially vertical blind elongate holes 68, distributed in the circumferential direction of the plate 60 and formed downward from the top face 62 and to near the bottom face 61, without reaching the latter. In the example represented, four elongate holes 68 are provided, between the protruding parts 65 and 66 and in twos on either side of the median zone of attachment of the suspension bar 67.

The elongate holes 68 are formed in such a way that their bottom end parts are substantially distributed between the vertical end faces 63 and 64.

In a manner equivalent to the preceding example, the elongate holes 68 result respectively from two cylindrical drillings 31 and 32 (FIG. 5), for example of identical diameters, which are eccentric relative to the circumferential direction of the plate 60 and partially overlap, the distance between their axes being less than their diameter. Thus, as in the preceding example, the elongate parts of intersection of the drillings 31 and 32 determine opposing elongate positioning ribs 33 and 34 respectively protruding into the holes 68, the elongate ribs 33 being on the inner side and the elongate ribs 34 being on the outer side of the contact plate 60.

The contact plate 60 further comprises, in its top part, a horizontal hole 69 which extends in its circumferential direction, from one of its vertical end faces 63 to its other vertical end face 64 and which passes through the vertical elongate holes 68.

The contact plate 60 also comprises, in its top part, vertical holes 70 and 71 which are formed from top to bottom in the protruding parts 65 and 66, in proximity to the end faces 63 and 64, and which emerge in the horizontal hole 69.

In a manner equivalent to the preceding example, the ends of the vertical holes are linked to external ducts 72 and 73.

Into the end parts of the horizontal hole 69, plugs 74 and 75 are inserted which do not reach the bottom ends of the vertical holes 70 and 71.

In a manner equivalent to the preceding example, the elongate holes 68 are equipped with elongate partitions 76 which pass through them by dividing them up and which comprise opposing edges having positioning grooves 39 and 40 cooperating with the ribs 33 and 34 (FIG. 5).

The bottom ends of the elongate partitions 76 are at short distances from the bottom ends or bottoms of the elongate holes 68 so as to determine connecting passages 77 in the bottom parts of these elongate holes 68.

The top ends of the elongate partitions 76 are borne by and fixed onto total blocking elements 78 which are arranged in the top ends of the elongate holes 68, above the horizontal hole 68. The total blocking elements 45 and 46 totally block the top ends of the elongate holes 68 by closely following the form of their section, namely, respectively, the drillings situated on both sides of the elongate partitions 76 (FIG. 7). The elements 78 can be in two parts between which are sandwiched the top ends of the elongate partitions 76.

Thus, the elongate partitions 76 extend in planes substantially containing the axis of the electrode 1 and face portions of the horizontal hole 69.

The result of the above is that the contact plate 60 comprises an internal channel 79, the ends of which are linked to the external ducts 72 and 73, of which portions are defined by the vertical holes 70 and 71, of which portions are defined by portions of the horizontal link hole 69, and of which portions are defined, in the holes 68, by elongate flow spaces 68a-68b which are formed on either side of the elongate partitions 68 and which communicate through the bottom connecting passages 77.

Consequently, the bottom connecting passage 77 between the elongate spaces 68a and 68b of each elongate hole 68 is situated vertically at a distance from the horizontal hole 69 of which corresponding portions form an inlet into one and an outlet from the other of these elongate spaces 68a and 68b.

The external intake and discharge ducts 65 and 66 are linked to a fluid source having fluid driving means.

Thus, a coolant such as water, entering for example through the external duct 72, can circulate successively in the elongate holes 68 linked in series, to be then discharged through the external duct 73. More specifically, the coolant circulates, in each elongate hole 68, downward in its elongate space 68a by having passed through an adjacent portion of the horizontal hole 69, then upward in its elongate space 68b by having passed through its bottom connecting passage 77, then in another adjacent portion of the horizontal hole 69.

Should the coolant enter through the external duct 73, it would circulate in the other direction and would be discharged through the external duct 72.

In a manner equivalent to the preceding example, to manufacture the contact plate 60, it is possible to proceed as follows.

Take a flat plate, generally copper-based metal.

Produce holes 68, 70 and 71 by piercing or drilling.

Fit the partitions 76 provided with the support and blocking elements 78 by sliding them into the elongate holes 68, until these elements 78 come into contact on shoulders formed in these holes.

Fit the end plugs 74 and 75 into the ends of the hole 69.

Deform, for example by hot bending, said duly equipped flat plate until the contact plate 60 is obtained in such a way that its inner face forms a cylinder segment.

The contact plates which have just been described notably offer the following advantages.

They have no plug in their bottom parts subject to the heat of the bath.

The fluid circulation means that they comprise make it possible to ensure a discharge of the heat that is better distributed in the volume of the plates, that more uniform or distributed temperature gradients are obtained, that the geometrical shape of the plates is better maintained, that the risks of electrical arcs being struck between plates and electrodes are reduced, that the passage of the current is better distributed and, ultimately, that the uniformity and the control of the baking of the electrode paste are improved and that the consumption of the coolant such as water is reduced.

According to a variant embodiment, said elongate partitions inserted into said elongate holes could extend to the blind bottom ends of these elongate holes and could have connecting openings formed through their bottom end parts.

According to a variant embodiment, if the elongate holes were to have sections other than those proposed, the elongate edges of said elongate partitions could be arranged in a manner adjacent to opposing elongate zones of the walls of said elongate holes by means other than ribs and grooves. For example, if the elongate holes were to have circular sections, the elongate partitions could be arranged along diametral planes of the elongate holes and their elongate edges would be adjacent to elongate zones corresponding to the ends of these diametral planes.

The present invention is not limited to the examples described above. Many variants are possible without departing from the framework of the invention.

The invention claimed is:

1. A contact plate intended to be placed in contact with the wall of an electrode of an electro-metallurgical furnace, comprising at least one internal channel having at least one inlet and at least one outlet likely to be respectively linked to at least one external fluid intake duct and to at least one external duct for discharging this fluid,
   the contact plate further comprising a plurality of elongate holes which extend from top to bottom and have blind bottom ends,
   in which an elongate partition is installed in each elongate hole, the top end of the elongate partition being carried by a blocking element fitted into a top part of said elongate hole, the elongated partition having opposed elongate edges adjacent to opposing elongate zones of the elongate hole so as to define, in the hole, elongate spaces on either side of the elongate partition, the bottom end of said elongate partition defining a connecting passage formed in the vicinity of the blind bottom end of the elongated holes,
   and in which the elongate spaces of the elongated holes are successively linked in series by link holes formed in the plate at a distance from said connecting passages and in the vicinity of the blocking elements,
   wherein elongate spaces and the link holes form portions of said internal channel.

2. The plate as claimed in claim 1, in which the elongated holes and the elongated partitions thereof have opposing elongate ribs and opposing elongate grooves, which are fitted into one another.

3. The plate as claimed in claim 2, in which the elongate holes comprise two eccentric cylindrical elongate drillings partially overlapping and of which the intersecting elongate parts determine protruding opposing elongate ribs.

4. The plate as claimed in claim 1, in which at least one elongate hole includes a first drilling and a second drilling, wherein the first drilling and the second drilling have the same diameter, and wherein a distance between the first drilling and the second drilling is smaller than the diameter.

5. A method for manufacturing a vertical plate having inner and outer faces, top and bottom faces and circumferential end side faces, characterized in that it consists:
   in drilling blind elongate holes from the top face, which extend downward without reaching the bottom face,
   in drilling at least one horizontal link hole from at least one of the side faces, parallel to the inner face and to the top face and connecting said vertical holes, in fitting, into at least some of said elongate holes, elongate partitions in a position such that the partitions have opposing elongate edges adjacent to opposing elongate zones of the elongate holes and determine a connecting passage in the vicinity of blind bottom ends of the holes, the elongate partitions being secured to plugging elements of the elongate holes situated above said horizontal hole.

6. The method as claimed in claim 5, characterized in that it consists in performing the above-mentioned steps in a flat plate and, in a subsequent step, in bending this plate in such a way that its inner face forms a cylinder segment.

\* \* \* \* \*